United States Patent Office 3,333,751
Patented Aug. 1, 1967

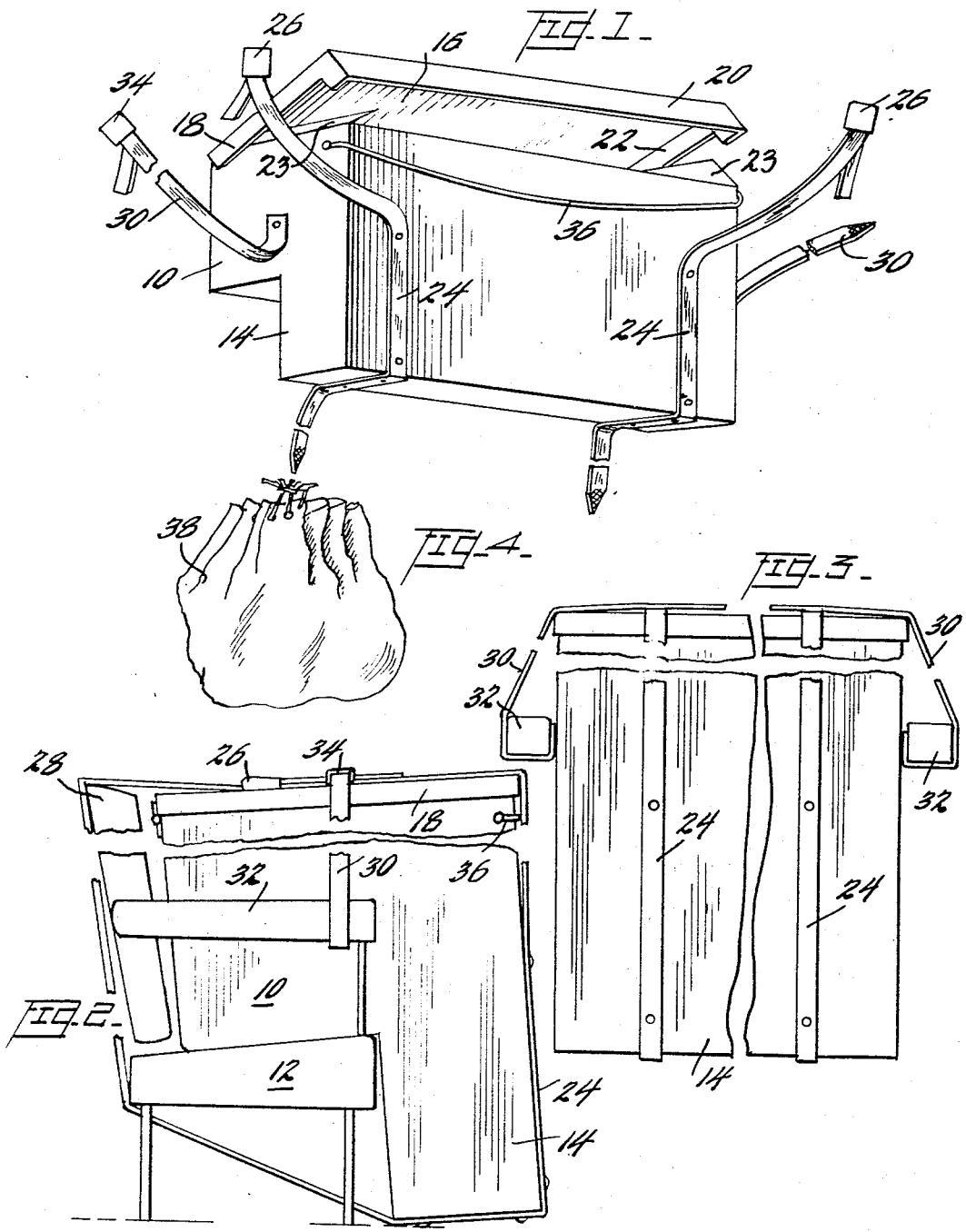

3,333,751
FLEXIBLE BAGGAGE CARRIER
Samuel Brown, P.O. Drawer 269,
Mobile, Ala. 36601
Filed June 27, 1966, Ser. No. 560,501
6 Claims. (Cl. 224—42.42)

ABSTRACT OF THE DISCLOSURE

A flexible baggage carrier constructed for placement on a vehicle seat and straps to secure said carrier to the seat.

---

This invention relates to containers, and more particularly to a flexible baggage carrier.

The invention includes means for securing the baggage firmly to a seat having armrests thereon in a manner to prevent movement of the bag with respect to the seat in any direction. The invention has particular utility in aircraft for storing or transporting mail, packages, baggage, and other articles on seats in the aircraft unused by passengers. The invention is rigidly securable to the unused seat so that it will not slip or slide in any direction with respect to the seat in order to prevent possible damage to the contents of the invention and possible damage from wear to the outer surface of the invention contacting the seat. When not in use, the invention is readily foldable into a small place, storage capacities in aircraft being extremely limited. A number of these carriers might be provided for a single aircraft and be used according to storage facilities required and numbers of seats unused.

In the preferred embodiment of the invention, the carrier includes a 7-sided carrier structure having a length corresponding to the approximate width of the seat with which it is to be used, and a width corresponding generally to the space between the forward portion of the back of the seat on which the invention rests and the back of a seat located forwardly of the seat employed. The height of the carrier may be variable as desired; normally, it extends to the top of the back of the seat on which the invention rests in order to utilize all available space. The carrier includes a depending, forward portion in order to utilize floor space between seats on the aircraft. A pair of straps are secured to the container adjacent each lengthwise portion thereof and and are adapted to pass around the carrier and the seat in order to secure the invention firmly thereto. Additionally, a pair of lateral straps may be provided to engage the armrests of a seat to prevent lateral shifting of the invention. The carrier includes an openable top flap and side flaps and a resilient strap may be provided to hold the carrier open when filling or emptying the same. Finally, some sort of storage container may be provided for storing the carrier when not in use.

Further objects and advantages of the invention may be had by reference to the following specification and drawings in which:

FIGURE 1 is a perspective view of the invention;

FIGURE 2 is an elevational, side view of the invention showing the same attached to a seat having armrests;

FIGURE 3 is a front, elevational view of the invention as shown in FIGURE 2; and FIGURE 4 illustrates a storage container for the carrier.

Referring now to the drawings by reference character, the invention is shown comprising a unitary structure including a major portion 10 adapted to rest on a seat 12 and a depending, forward portion 14 adapted to occupy floor space between seats. A top 16 is secured along the back panel of major portion 10 and includes depending side edges 18, 20, and 22, which are adapted to lie over the remaining vertical faces of the carrier to seal the same. A pair of side flaps 23, 23 are provided to assure complete sealing of the carrier. In the preferred embodiment, the carrier and top 16 are constructed of flexible material so that the invention may be easily stored when not in use, and may be conformed to the contents of the carrier when in use to prevent internal shifting of the contents. A pair of lateral side straps 24, 24, are secured to the forward wall of the carrier and to the bottom of forward portion 14 and are further provided with suitable means for securing the free ends of the straps together, such as buckles 26, 26. Straps 24, 24, are adapted to pass beneath seat 12 and behind seat back 28, as shown in FIGURE 2, to secure the carrier rigidly to seat 12. Major portion 10 is constructed to extend as high as seat back 28; straps 24 pass up the rear face of seat back 28 and over the top thereof to secure the carrier firmly to both seat 12 and back 28. A pair of end straps 30, 30, are secured to each vertical end of major portion 10 and are adapted to pass beneath and over armrests 32 of seat 12. A buckle 34 may be provided to secure the free ends of straps 30, 30 together, as shown in FIGURE 3, so as to prevent sidewise shifting of the carrier on seat 12 and further to secure top 16 to the carrier. Alternatively, straps 30, 30 might be secured to the seat belts normally provided on an aircraft seat to prevent side shifting of the carrier (not shown).

As shown in FIGURE 1, a stretch cord 36 may be mounted to the forward, open end of the carrier to hold the carrier open while filling or removing articles therefrom. FIGURE 4 indicates a storage container 38 in the form of a duffle bag which may be employed to store the carrier when not in use.

Normally, several carriers will be used on board a single aircraft at the same time. A loading and unloading operation of these containers may proceed as follows. Preferably, a single storage bag 38 will be provided for each carrier. A number of bags 38, each containing a carrier may be carried down the aisles of the aircraft and be deposited on the seats to be used for holding baggage or other cargo. Then, each bag 38 is opened to remove the carrier. The center armrest (not shown) of the aircraft seat and the storage bag 38 may be inserted into the invention to insure availability when the invention is to be stored after use. Cargo of any character may be inserted into the invention; stretch cord 36 may be employed to hold the carrier open while loading. Then, side flaps 23, 23 are folded inwardly, top 16 is closed, and the carrier is secured in a closed position and to seat 12 by buckling straps 24, 24 and 30, 30 together in the manner described above. When the invention has completed its purpose, and is to be stored out of use, the above described procedure is carried out in reverse.

It is apparent from the foregoing that I have invented a new and highly useful device in the art of flexible containers, and thus I am not to be limited to the exact construction as hereinbefore provided, except as may be deemed to be within the scope of the following claims.

I claim:

1. A flexible baggage carrier, for use with a chair structure having a seat and armrests, comprising a unitary structure having a major portion adapted to rest on said seat and a smaller portion extending forwardly and downwardly from said major portion, first strap means extending beneath said seat and secured to the carrier, and second strap means secured at its ends to the carrier and adapted to engage said armrests whereby transverse and lateral movement between said carrier and the chair structure is prevented.

2. The carrier of claim 1 wherein said unitary structure is provided with a flap top, to provide access to the interior of said carrier, said top secured along one edge thereof to said major portion and having edges adapted to lay over the remaining, open, upper sides of said structure.

3. The carrier of claim 2 wherein said major portion is further provided with side flaps along opposite upper side edges thereof, adapted to lie interiorally of said top.

4. The carrier of claim 2 wherein said structure is provided with a resilient strap on a side opposite the side of the structure to which the top is secured, whereby said carrier is fully openable by grasping said strap and the free end of said top and moving said strap and free end away from each other.

5. The carrier of claim 1 wherein said first strap means comprises a pair of first straps, one secured adjacent each longitudinal end of said carrier on the forward wall thereof and on the bottom of said smaller portion, each said strap adapted to encircle said seat and the carrier, and a pair of first buckle means, one to each strap, for securing the free ends of said strap together.

6. The carrier of claim 1 wherein said second strap means comprises a second pair of straps, one secured to each outer end wall of the carrier, each said second strap adapted to pass outwardly beneath said armrest and over said armrest toward the top center of said carrier, and second buckle means for securing the free ends of said second pair of straps together.

References Cited

UNITED STATES PATENTS

| | | | |
|---|---|---|---|
| 1,233,661 | 7/1917 | Gordon | 224—42.42 |
| 1,280,362 | 10/1918 | Alveson et al. | |
| 2,502,963 | 4/1950 | Klee | 224—42.42 |
| 3,014,759 | 12/1961 | Bing. | |

GERALD M. FORLENZA, *Primary Examiner.*

R. J. SPAR, *Assistant Examiner.*